United States Patent Office 2,991,232
Patented July 4, 1961

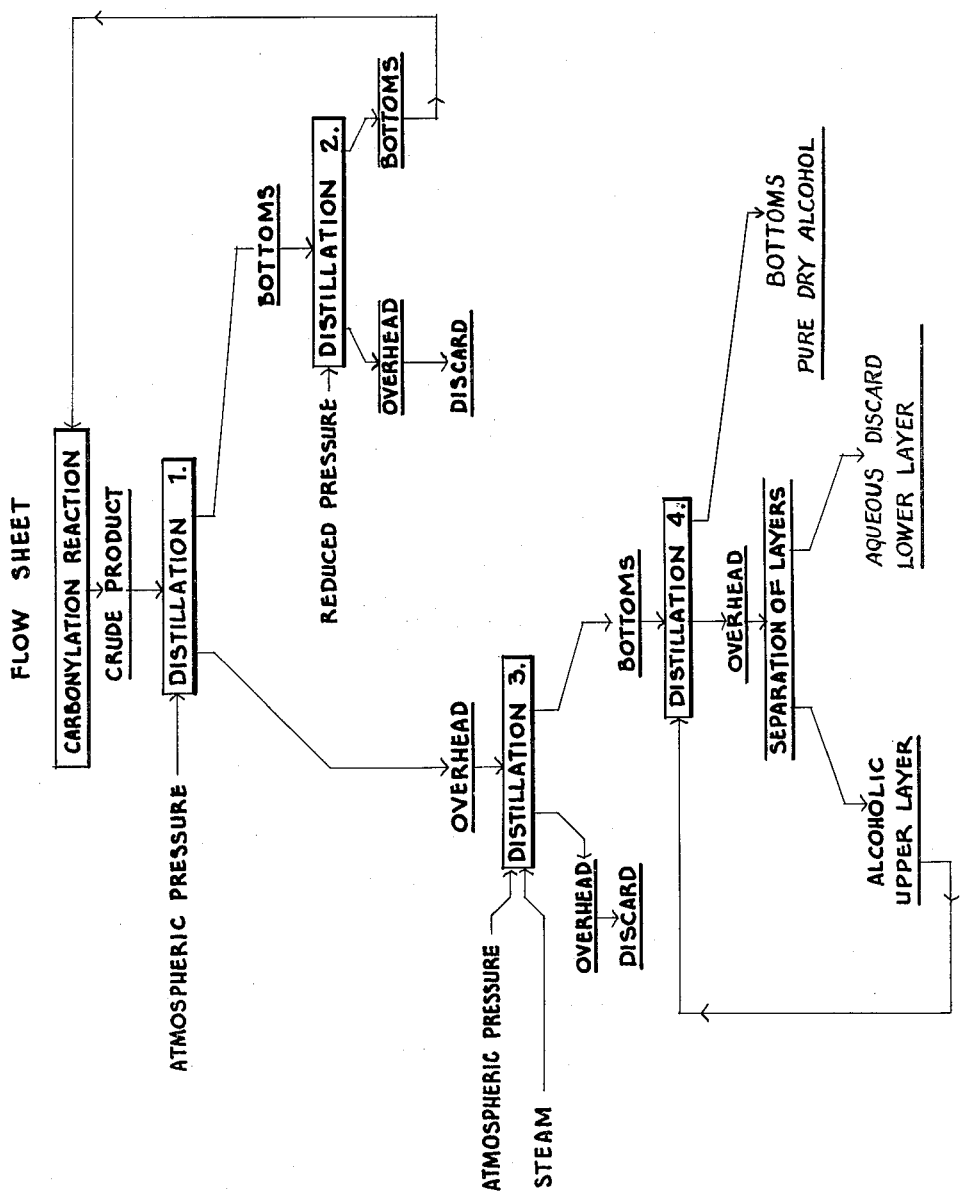

2,991,232
SEPARATION OF ALCOHOLS
Sidney Arthur Lamb, Henry Owen Smith, and Geoffrey Norcross, Norton-on-Tees, England, assignors to Imperial Chemical Industries Limited, London, England, a corporation of Great Britain
Filed June 29, 1956, Ser. No. 594,691
Claims priority, application Great Britain Aug. 17, 1955
4 Claims. (Cl. 202—42)

This invention relates to the separation of alcohols in substantially pure form.

It is known that aliphatic alcohols can be produced from olefines by carbonylating them with carbon monoxide and hydrogen and thereafter hydrogenating the product, preferably after removing the carbonylation catalyst. When lower aliphatic alcohols such as propyl, butyl and amyl alcohols are thus produced it is necessary or desirable to have present in the carbonylation zone a high boiling burden oil. It has been found that $C_3$ to $C_5$ alcohols produced in this way sometimes contain contaminants, such as ethers and lower alcohols, which adversely affect the quality of the desired alcohol. The present invention has as an object the preparation, from such crude carbonylation products, of alcohols of high quality substantially free from such contaminants, and in particular substantially free from ethers, which adversely affect the miscibility of the alcohol with water.

According to the present invention there is provided a continuous process for the separation of a desired aliphatic mono-alcohol, or alcohols containing from three to five carbon atoms in the molecule in substantially pure condition, from the crude carbonylation product of a $C_2$ to $C_4$ aliphatic olefine containing the said mono-alcohol, or alcohols along with other oxygenated compounds and a high boiling burden oil, which comprises: distilling in a first step the crude product at atmospheric or reduced pressure and taking off an overhead fraction containing a high proportion of the said alcohol or alcohols and a bottom product comprising largely burden oil; distilling the said bottom product at reduced pressure in a second step and taking off as bottoms a burden oil suitable for recycling to the carbonylation synthesis and an overhead fraction comprising a small amount of intermediate-boiling heavy ends and of desired alcohol (which latter is preferably kept as small as possible); subjecting the overhead product from the first step to distillation at atmospheric pressure in the presence of a relatively small proportion of steam in a third step, the feedstock for this step being introduced at an intermediate point of the column and preferably at least some steam quite near the bottom thereof, and taking off as overhead an aqueous mixture which is suitable for discarding, containing at least some of the desired alcohol or alcohols, together with contaminants such as ethers, lower alcohols and hydrocarbons and amounting at most to 30% by weight of the feedstock to the third step, and as bottoms a mixture of the desired alcohol or alcohols containing a minimum and controlled amount of contaminants, which may be substantially dry.

Beyond 30% the yields become uneconomically low. Preferably the proportion of steam in the third step should not exceed 10% by weight of the dry feed material.

When ethylene is carbonylated the carbonylation product comprises substantially one $C_3$ alcohol, viz; n-propanol and this can be recovered according to the invention in substantially pure anhydrous form from the bottoms from the third column by known means, e.g. by azeotropic distillation using an entrainer, such as benzene or trichlorethylene.

Isobutylene when carbonylated yields substantially only one alcohol, 3-methylbutanol-1 and the alcohol may be recovered by submitting the bottoms from the third column to distillation in a fourth step, preferably at atmospheric pressure, and obtaining as bottom fraction the substantially pure dry alcohol, and taking off overhead an aqueous azeotrope of the alcohol from which after condensation the upper layer is returned as reflux to the fourth step.

When propylene and n-butenes-1 and -2 are the starting olefines the process described in the following paragraph is preferred.

According to a further feature of the present invention there is provided a continuous process for the separation of two desired isomeric aliphatic mono-alcohols containing 4 or 5 carbon atoms in the molecule from the crude carbonylation product of propylene or n-butenes-1 and -2 containing said alcohols along with other oxygenated compounds and a high boiling burden oil, which comprises: distilling in a first step the crude product at atmospheric or reduced pressure and taking off an overhead fraction containing a high proportion of the said two isomeric alcohols and a bottom product comprising largely burden oil; distilling the said bottom product at reduced pressure in a second step and taking off as bottoms a burden oil suitable for recycling to the carbonylation synthesis and an overhead fraction which is suitable for discarding, comprising a small amount of intermediate heavy ends and of desired alcohol which latter is preferably kept as low as possible; subjecting the overhead product from the first step to distillation at atmospheric pressure in the presence of a small proportion of steam in a third step, the feedstock for this step being introduced at an intermediate point of the column and, preferably, steam quite near the bottom thereof and taking off as overhead an aqueous mixture which is suitable for discarding, containing at least one of the desired isomeric alcohols, together with contaminants such as ethers, lower alcohols, and hydrocarbons and amounting at most to 30% of the feedstock to the third step, and as bottoms a mixture of the desired isomeric alcohols containing a minimum and controlled amount of contaminants and a small proportion of water; submitting the bottom fraction from the third step to distillation at atmospheric pressure and obtaining as bottoms a mixture of the substantially pure dry isomeric alcohols, and taking off as overheads an aqueous azeotrope of said alcohols from which after condensation the upper layer is returned as reflux to the fourth step; and distilling the bottom product from the fourth step preferably at atmospheric pressure in a fifth step, whereby there are obtained in substantially pure dry form one of the desired alcohols as overhead, and the other as bottom product.

In the accompanying drawing, a flow sheet which contains self-explanatory legends illustrates the process of this invention and will further aid in the understanding thereof. In this flow sheet, the carbonylation reaction and the distillation steps are enclosed in boxes. The distillation steps are also numbered in the order above described. "Materials" introduced or removed from the various stages are underlined. Words indicating the conditions for the respective stages are not underlined.

The process of the invention is of especial value for separating n-butanol of improved quality from the crude product obtained by the carbonylation, followed by hydrogenation, of propylene using as burden oil high boiling oxygenated compounds or hydrocarbons. Here the main contaminants are ethers, methanol, isopropanol and hydrocarbons. An example of the process as applied to the separation of substantially pure isobutanol and normal butanol from such a crude product follows.

NO. 1 COLUMN

This operates at atmospheric pressure and with top and bottom temperatures of about 117° and 250° C. respectively. The overheads, comprising about 85% mixed butanols and 15% lower boiling compounds, are fed to column 3; and the bottoms comprising largely burden oil are fed to column 2.

NO. 2 COLUMN

This operates on the bottoms from column 1, at approximately 250 milliats and with top and bottom temperatures of about 140° and 240° C. respectively. The overheads comprising a small amount of intermediate heavy ends and n-butanol are discarded. The bottoms comprising burden oil are recycled to the carbonylation zone.

NO. 3 COLUMN

This operates on the overheads from column 1 in the presence of a small proportion of steam (amounting to about 10% by weight of the dry feed material) at atmospheric pressure and with top and bottom temperatures of about 90° and 115° C. respectively. Preferably steam is introduced near the bottom of the column.

A mixture of isobutanol, methanol, ethers, isopropanol etc. amounting to about 20% by weight of the feed, is taken overhead as an "azeotrope" with water, and is discarded.

The bottoms from column 3, comprising mixed n- and iso-butanols and containing only the slightest trace of ethers are fed to column 4.

NO. 4 COLUMN

This operates on the bottoms from column 3 at atmospheric pressure and with top and bottom temperatures of about 90° and 118° C. respectively, and serves to dry the butanols. The overhead is water containing a little butanol, which is discarded; and the bottoms are substantially pure dry butanols, which are fed to column 5.

NO. 5 COLUMN

This operates on the bottoms from column 4, at atmospheric pressure and with top and bottom temperatures of 108° and 120° C. respectively, to produce as overhead product isobutanol containing less than 2% n-butanol and less than 0.2% ethers, and as bottom product n-butanol containing less than 0.5% isobutanol and less than 0.1% ethers.

By introducing several plates beneath the steam inlet to the third column, it is possible to omit the fourth column from the system when refining butanols, and also when refining n-propanol or amyl alcohols. However, when this is done all the steam must be taken overhead and this causes unnecessary loss of product if an excess of steam is being used. This disadvantage can be in large measure overcome by controlling the addition of steam on the basis of the analysis of the feed or overhead of column 3.

The invention is illustrated by the following examples.

Example 1

This illustrates operation of columns 3 and 4 of the system described above when operating on three synthetic mixtures simulating in composition the overhead fraction from column 1, of that system when operating on the carbonylation product of propylene except that they comprised only one ether and n-butanol, instead of mixed butanols. These synthetic mixtures had the following composition by weight in which the ether was one known to be present in such carbonylation product.

|  | Percent |
|---|---|
| n-Butanol | 75 |
| Alkyl ether | 15 |
| Water | 10 |

There was used a single 6′ x 1″ diameter fractionating column packed with 3/16″ wire gauze cylinders, which was operated at a reflux ratio of 50:1.

The lightest fractions, which correspond to the overheads from column 3 of the above described system, contained substantially all the ether and had the respective compositions:

| Mixture | Alkyl ether | Composition of lightest fraction, wt. percent | | |
|---|---|---|---|---|
| | | n-butanol | water | ether |
| (1) | di-n-butyl | 38 | 29 | 33 |
| (2) | n-butyl/iso-amyl | 43 | 35 | 22 |
| (3) | n-butyl/n-amyl | 46 | 38 | 16 |

The intermediate fractions, which correspond to the bottoms from column 3, that is the feed to column 4, of the above system comprised aqueous n-butanol.

The higher boiling fractions, which correspond to the bottoms from column 4, were at least 99.5 pure n-butanol.

Fully analogous results would have been obtained had the synthetic mixture contained mixed butanols, as the actual carbonylation product does.

It is thus evident that the process provides a method of obtaining butanols substantially free from ethers.

Example 2

This illustrates operation of column 3 of the system described above on two synthetic mixtures, A and B, simulating in composition the overhead fraction from column 1 of that system, except that each mixture contained only one ether.

There was used a continuous distillation apparatus comprising a 2′ x 1.5″ diameter fractionation column packed with 3/16″ ceramic rings and provided with an electrically heated boiler having an adjustable dip-tube enabling even two-phase bottoms product of true composition to be taken off, and at the top with a vapour-split head enabling reflux of the same composition as the overhead product to be returned to the top of the column. This apparatus simulated the conditions obtaining in a section of column 3 which is defined by the composition of the synthetic mixture fed to the apparatus. The pre-heated feed was introduced at the mid-point of the column, and a reflux ratio of 20:1 was used.

The following table shows the amounts of the overhead and bottom fractions obtained by the distillation of 100 parts by weight of mixtures A and B and the distribution of the components between the two fractions.

| Component | Synthetic mixture A | | Synthetic mixture B | |
|---|---|---|---|---|
| | Overheads | Bottoms | Overheads | Bottoms |
| n-butanol | 1.46 | 40.6 | 1.96 | 58.7 |
| iso-butanol | 5.22 | 15.0 | 4.05 | 20.2 |
| di-n-butyl ether | 2.55 | 0.2 | 0.42 | 0.09 |
| water | 4.34 | 30.6 | 3.69 | 10.9 |
| | 13.6 | 86.4 | 10.1 | 89.9 |

The amounts of ether in the bottom fractions (A) and (B) calculated on the water free basis are: (A)—0.35%; (B)—0.11%.

Each of these bottom fractions would on subsequent distillation in columns 4 and 5 in the manner described above yield n- and isobutanol substantially free from di-n-butyl ether.

It is thus evident that the process provides a method of obtaining butanols substantially free from ethers.

We claim:

1. A continuous process for the removal of contaminating ether and hydrocarbon impurities and burden oil from and for the separation of two desired isomeric alcohols selected from the group consisting of aliphatic mono-hydroxy alcohols containing from 4 to 5 carbon atoms from the crude carbonylation product of an olefin selected from the group of alkenes consisting of propylene and n-butene-1- and n-butene-2, wherein said crude carbonylation product comprises lower alcohols and ethers, hydrocarbons and said burden oil, so as to provide said desired alcohols in substantially pure condition and containing at most 0.1% by weight of said ethers, which comprises: distilling in a first step the crude product and taking off an overhead fraction containing a high proportion of the said two isomeric alcohols and a bottom product substantially comprising burden oil; distilling said bottom product at reduced pressure in a second step and taking off as bottoms a burden oil suitable for recycling to the carbonylation synthesis and an overhead fraction which is suitable for discarding, comprising a small amount of intermediate heavy ends and of said desired alcohols; subjecting the overhead product from said first step to distillation in a third step at atmospheric pressure in the presence of a proportion of steam amounting at most to 10% by weight of the dry feedstock to this step, the feedstock for this step being introduced at an intermediate point of the column and steam quite near the bottom thereof and taking off as overhead an aqueous mixture suitable for discarding and containing at least one of the desired isomeric alcohols, together with contaminants such as ethers, lower alcohols, and hydrocarbons and amounting at most to 30% of said feedstock to said third step, and as bottoms a mixture of said desired isomeric alcohols in which the proportion of ethers calculated on the sum of the weights of the desired anhydrous alcohols is at most 0.1% by weight and a small proportion of water; submitting said bottom fraction from said third step to distillation at atmospheric pressure in a fourth step and obtaining as bottoms a substantially pure dry mixture of said desired alcohols, and taking off as overheads an aqueous azeotrope of said alcohols from which after condensation the upper layer is returned as reflux to said fourth step; and distilling the bottom product from said fourth step in a fifth step, and obtaining in substantially pure dry form one of said desired alcohols as overhead and containing at most 0.1% by weight of ethers, and the other of said desired alcohols as bottom product and containing at most 0.1% by weight of ethers.

2. A process as claimed in claim 1 for the separation of n-butanol-1 and isobutanol-1 substantially free from ethers, methanol, isopropanol and hydrocarbons from the crude carbonylation product of propylene using a burden oil selected from the group of organic liquids consisting of high boiling oxygenated compounds and hydrocarbons wherein there is taken off as said overheads in said third step a mixture comprising isobutanol, isopropanol, methanol, ethers, hydrocarbons and water.

3. A process as claimed in claim 1 for the separation of n-propanol, butanols, and amyl alcohols from the crude carbonylation product of an olefine selected from the group of alkenes consisting of ethylene, propylene, and butenes, wherein an appropriate number of plates is provided in the column of the third step below the steam inlet thereto and the quantity of steam is controlled at a low amount by analysis of the feed or overhead streams to or from the column.

4. The process of claim 1 wherein said distillation in said third step removes substantially all of the water therein as overhead and said bottoms from this step are substantially free from water.

References Cited in the file of this patent

UNITED STATES PATENTS

| | | |
|---|---|---|
| 851,286 | Guillaume | Apr. 23, 1907 |
| 1,614,877 | Clapp | Jan. 18, 1927 |
| 1,676,700 | Lewis | July 10, 1928 |
| 1,937,786 | Richard et al. | Dec. 5, 1933 |
| 2,080,064 | Roelfsema | May 11, 1937 |
| 2,290,636 | Deanesly | July 21, 1942 |
| 2,324,255 | Britton et al. | July 13, 1943 |
| 2,564,130 | Schreyer | Aug. 14, 1951 |
| 2,614,070 | Smith | Oct. 14, 1952 |
| 2,635,072 | Eliot | Apr. 14, 1953 |
| 2,669,589 | Catterall et al. | Feb. 16, 1954 |
| 2,671,119 | Mertzweiller | Mar. 2, 1954 |
| 2,695,867 | Chambers | Nov. 30, 1954 |
| 2,763,693 | Vander Woude et al. | Sept. 18, 1956 |
| 2,764,536 | Hutchins | Sept. 25, 1956 |
| 2,779,720 | Tanona | Jan. 29, 1957 |
| 2,787,586 | Catterall | Apr. 2, 1957 |
| 2,801,210 | Mueller et al. | July 30, 1957 |
| 2,874,096 | Scheeline et al. | Feb. 17, 1959 |

FOREIGN PATENTS

| | | |
|---|---|---|
| 444,117 | Great Britain | Mar. 16, 1936 |